US008089045B2

(12) United States Patent
Klock et al.

(10) Patent No.: US 8,089,045 B2
(45) Date of Patent: Jan. 3, 2012

(54) METHOD AND APPARATUS FOR RAISED MATERIAL DETECTION

(75) Inventors: Hansjorg Klock, Rufenacht (CH); Alexandre Gret, Liebefled (CH); Cirillo Ghielmetti, Laupen (CH)

(73) Assignee: De La Rue International Limited, Basingstoke (GB)

( * ) Notice: Subject to any disclaimer, the term of this patent is extended or adjusted under 35 U.S.C. 154(b) by 521 days.

(21) Appl. No.: 12/308,468

(22) PCT Filed: Aug. 16, 2007

(86) PCT No.: PCT/GB2007/003116

§ 371 (c)(1), (2), (4) Date: Feb. 18, 2009

(87) PCT Pub. No.: WO2008/020208

PCT Pub. Date: Feb. 21, 2008

(65) Prior Publication Data

US 2009/0310126 A1 Dec. 17, 2009

Related U.S. Application Data

(60) Provisional application No. 60/878,382, filed on Jan. 4, 2007.

(30) Foreign Application Priority Data

Aug. 18, 2006 (GB) .................................. 0616495.8

(51) Int. Cl.
*G06K 9/74* (2006.01)

(52) U.S. Cl. ..................... 250/330; 250/365; 250/336.1; 250/372; 250/341.8; 250/338.1; 356/51; 356/71; 356/601; 356/612

(58) Field of Classification Search .................. 250/330, 250/365, 336.1, 372, 341.8, 338.1; 356/51, 356/71, 601, 612
See application file for complete search history.

(56) References Cited

U.S. PATENT DOCUMENTS

| | | | |
|---|---|---|---|
| 4,525,630 A | 6/1985 | Chapman | |
| 7,465,948 B2 * | 12/2008 | Reich et al. | 250/559.04 |
| 2003/0015025 A1 * | 1/2003 | Lindig | 73/105 |
| 2003/0112439 A1 * | 6/2003 | Nettekoven et al. | 356/430 |
| 2004/0032581 A1 | 2/2004 | Nikoonahad et al. | |
| 2005/0133990 A1 | 6/2005 | Mukai | |

FOREIGN PATENT DOCUMENTS

| | | |
|---|---|---|
| EP | 1 011 079 A1 | 6/2000 |
| JP | A-8-292158 | 11/1996 |
| WO | WO 2006/028077 A1 | 3/2006 |

* cited by examiner

*Primary Examiner* — David Porta
*Assistant Examiner* — Djura Malevic
(74) *Attorney, Agent, or Firm* — Oliff & Berridge, PLC

(57) ABSTRACT

A method is provided of detecting a region of raised material on a document surface. A surface of the document is illuminated with at least one angled radiation beam such that any raised material on the document surface reflects the radiation. The surface containing the raised material is imaged using at least one radiation detector. The image is then processed to detect the existence on the document surface of the raised material. The illuminating step causes a reflection and/or shadow to be generated from at least one edge of the raised material. The processing step detects the location of the material using the said reflection and/or shadow from the at least one edge.

55 Claims, 8 Drawing Sheets

METHOD AND APPARATUS FOR RAISED MATERIAL DETECTION

FIELD OF THE INVENTION

The present invention relates to a method of detecting a region of raised material on a document surface. A suitable apparatus for performing the method is also disclosed.

BACKGROUND TO THE INVENTION

In many different applications documents are provided which contain regions of raised material. Typically this is material that is either added to the document surface deliberately or as the result of some activity by a third party. It is often desirable to be able to detect such material, whether this material is, deliberately or accidentally, either attached to or forming part of the document. One particular application where such a procedure is important is in the field of the document security.

One such type of raised material is that of adhesive tape applied to documents such as banknotes. It is desirable to be able to detect the presence of such tape automatically since this may be indicative of damage to the document and the document (such as a banknote) can then be removed from circulation. Tape may also be present in counterfeit notes such as "composite notes". One such method of detecting tape is provided in U.S. Pat. No. 4,525,630 in which photodetectors measure the level of light reflected specularly and diffusely from a region of the document, this comparison enabling adhesive tape to be detected due to its different reflective properties in comparison with those of the banknote itself.

However, there is a need to improve upon the detection of such raised material, not only in the terms of the type of material that may be detected, but also since counterfeiters and other persons interested in the breech of the document security, are increasingly sophisticated. There is therefore a desire to improve the ability to detect raised material on documents.

SUMMARY OF THE INVENTION

In accordance with a first aspect of the present invention we provide a method of detecting a region of raised material on a document surface comprising illuminating a surface of the document with at least one angled radiation beam such that any raised material on the document surface reflects the radiation, imaging the surface containing the raised material using at least one radiation detector, and processing the image to detect the existence on the document surface of the raised material, wherein the illuminating causes a reflection and/or shadow to be generated from at least one edge of the raised material and wherein the processing step detects the location of the material using the said reflection and/or shadow from the at least one edge.

We have realised that the existence of raised material can be successfully detected in a very efficient and accurate manner by the use of radiation impinging upon a document surface at an angle, in conjunction with detecting the image of the document illuminated in such a manner and subsequent processing of the image data.

Fundamentally, the image is processed to detect the existence, that is the presence, of the raised material. Typically not only the existence of the material is detected, the location is also detected by suitable processing.

The types of documents that may be used with the present invention include substantially inflexible documents such as boxes or other containers, although typically the invention finds particularly use with relatively thin flexible documents such as sheet materials. The document surface is preferably substantially planar, at least during the illuminating and imaging steps (in the case of flexible documents) since this provides a relatively large document region to be imaged at one time. In many cases the illumination causes a reflection from at least one edge of the material and therefore the processing step in such cases is preferably adapted to detect the location of the material using the identified reflection from the at least one edge. The illumination may also, or instead, cause a shadow to be generated from at least one edge and in this case the processing step may detect the location of the material by identifying the location of the shadow. A combination of each of these above two methods is preferred. Thus, the raised material may comprise material added to the document subsequent to the time of manufacture of the document. The raised material may comprise material adhered to the document surface by a third party, other than the document manufacturer or constructor.

In general, the invention is most effective when large angles are used between the normal to the plane defining the document surface and the source of illumination (therefore approaching 90°), since good contrast between the raised material and the surrounding document surface is achieved. Preferably such an angle is 70° or higher and more preferably 80° or higher.

The method is also preferably performed using a radiation source with a high degree of collimation, at least in a direction substantially parallel with the normal to the document surface. Collimation in a plane substantially parallel to that of the document surface may also provide improved detection of the raised material.

Although a single localised radiation source could be used, thereby effectively acting as a localised or even a point source, preferably a plurality of radiation beams are provided, extending over one or more directions. These may be provided by a plurality of radiation emitters as individual radiation sources or these may act together as a common extended source, typically extending in one or more directions. The radiation beams may therefore be provided from radiation sources positioned substantially along lines to one or more sides of the document surface.

Alternatively, the radiation beams may be provided from radiation sources positioned in a distributed manner around the document surface. However, in all cases it is preferred that the radiation sources are positioned in substantially a plane that is parallel with the document surface (and almost coplanar therewith so as to provide a large angle). This ensures that any and each raised material boundaries upon the surface of the document may be used to identify the location of the raised material.

A number of different types of apparatus may be used in order to receive the radiation, these having the ability to obtain an image, either by mechanical scanning or preferably by constituting an imaging device having a field of view so as to receive radiation from different parts of the document and raised material. Depending upon the particular arrangement, one or more detectors (imaging devices) may be used although each is typically positioned to receive radiation from a path defining a small angle with respect to a normal to the plane of the particular part of the document surface being examined. Typically such a small angle is 10° or less with respect to the plane normal. Such an angle effectively provides a plan view of the document. It should be also noted that the detector(s) may alternatively, or in addition, be positioned to receive reflected radiation (either specularly or diffusely), or transmitted radiation, or, where a number of detectors are provided, a combination of each of these. For a transmissive detector, the detector is positioned on the opposite side of the document to the raised material such that the detector radiation is transmitted through the document prior to receipt.

In one arrangement two radiation detectors may be provided, one of which being located to detect light specularly reflected from the document surface and the other to detect light diffusely reflected from the document surface, these detectors together producing respective images which may be used in particular image processing methods to perform the invention. Furthermore in some circumstances it is preferred to further image the document under a "bright field" regime, either subsequently or simultaneously. In this case a radiation source is provided to provide illumination beams along or at a small angle to the normal defining the document plan being inspected. The bright field image obtained is then used in subsequent processing.

A number of processing methods suitable for use in the invention include the basic steps of:— a) filtering the image with an edge filter;
b) identifying straight line candidates within the filtered image;
c) comparing the identified candidates with a model of the raised material to be detected; and,
d) determining the location of the material based upon the comparison.

Such edge filtering is therefore-used to compare the image to a model which represents physical features that are expected to be encountered in the raised material of interest. The model may comprise a predefined template or "master pattern" containing data representing a clean or genuine document (such as a banknote), including data representing expected features such as lines, security devices or other indicia which might otherwise be incorrectly identified as unexpected raised material.

In the case of the use of specular and diffuse reflection images, the step of processing the image may comprise:— a) identifying candidate regions by comparing the specular and diffuse reflection images;
b) filtering the specular and/or diffuse reflection images with an edge filter;
c) identifying straight line candidates within the filtered image;
d) comparing the identified candidates with a model of the raised material to be detected; and,
e) determining the location and the material based upon the comparison.

Step (c) may comprise excluding candidates present within the predefined template.

In the case of the use of detectors for specular and diffuse reflection, the entire region of raised material is likely to behave differently in terms of its specular and diffuse reflection response when compared with the surrounding material. Comparison between such images may therefore reveal the location, including the boundaries, of the material in question.

In either case, assuming suitable illumination conditions, the raised material may provide a bright reflection at one edge facing towards the illumination direction, and a shadow at an edge facing away from the direction of illumination. In this case the identified candidates may be separated as positive candidates representing increased intensity with respect to the background, and negative candidates representing the decrease in intensity with respect to the background. The model may therefore be adapted to seek pairs of such edges which are indicative of the presence of a strip of tape for example. The method also preferably further comprises a step of identifying one or more edges of the document itself and removing these from the candidates.

Typically the method further comprises analysing the candidates to obtain dimensional information and using the dimensional information in the comparison step. The model may therefore include the arrangement of the candidates in pairs of spaced parallel lines. Depending upon the model, one or more of straight line, irregular (wavy) line or curved line candidates can be identified. The model may also include the arrangements of such lines spaced within a predetermined separation range and/or having a predetermined length range. The model may further include the arrangements of lines into shapes such as rectangles. The model may also further include a consideration of the sharpness of the lines within the image.

It will also be appreciated that not all material which may be raised with respect to the general surface of a document actually constitutes raised material of the type which one is interested in detecting, this being for example due to the material defects including manufacturing defects in the surface itself, wrinkles and other damage. The model is preferably adapted to perform sufficient tests and analysis in order to distinguish between such defects and the desired target raised material.

The raised material may take a number of forms, including tape, security devices (such as a hologram), raised print (such as intaglio printing) and other surface decoration. Typically however, the material is of the type which projects above the planar document surface and provides a general plateaued region of elevated material, raised with respect to the document surface, the plateau being defined by circumferential edges (straight and/or curved).

Preferably the document is a document of value such as a security document, such documents including banknotes, cheques, certificates and identification documents (including passports).

The present invention is also not limited to the type of radiation used, although typically it is preferred to use ultraviolet, visible or infra-red radiation, or any combination thereof.

In accordance with a second aspect of the present invention we provide apparatus for detecting a region of raised material on a document surface comprising at least one radiation source for illuminating, with a respective angled radiation beam, a surface of a document placed in an inspection position such that any raised material on the document surface reflects the radiation causing a reflection and/or shadow to be generated from at least one edge of the raised material, at least one radiation detector for obtaining an image of the illuminated document surface, and a processor adapted to process an image received from the radiation detector so as to identify the existence on the document surface of the raised material by identifying the location of the material using the said reflection and/or shadow from the said at least one edge.

This apparatus is therefore suitable for performing the method of the first aspect of the invention. The radiation sources may take a number of forms, these including lamps, lasers, light emitting diodes and so on. The preferred collimation, at least in the direction parallel to the planar of the document surface, may be provided by apertures or as a result of the particular device used (having inherent collimation for example). A laser may be used to perform the invention although, as for other sources, and particularly for the use of a laser beam, it may be necessary to cause relative movement between the source, document and detector so as to scan the document surface with the radiation beam and ensure that the raised material is detected if present.

Extended or multiple sources may be used so as to obviate the need for relative movement, although relative movement may still be additionally provided. In the case of two sources for example, one may be positioned on either side of the document with respect to a plane of inspection, although each of these actually lie for example above the surface containing the raised material. The plurality of radiation sources may also be provided so as to define a line along one or more sides of the document surface, though these may effectively constitute a single common source for each line. In order to provide the collimation along the plane defined by the document surface, it is preferred in the case of an extended source (either from one or more emitters), that a plurality of apertures are provided, distributed along the line length, so as to limit the width of the beam impinging upon the document surface (in a plane parallel to the document surface) from each source or each part of the source.

In other cases it may be desirable to provide an encircling arrangement of radiation sources, these being distributed about the normal defining the inspection location on the document surface. Such sources may be provided equidistant from the normal so as to be arranged in a ring or circle, although this is not essential. Preferably a full circle of sources either as a plurality of sources or a common extended circular source are provided such that a radiation beam impinges upon the document from all angles around the full circle. Typically a number of apertures may be distributed along the length of such an extended source or sources so as to limit the beam angle in the document plane, in each case.

It is preferred for all radiation sources however that these are positioned in substantially a plane parallel (although not coplanar) with the document surface. The radiation sources may be positioned additionally or alternatively so as to generate specularly reflected radiation and diffusely reflected radiation respectively. As described earlier, preferably the radiation is positioned so as to produce the beam angle at least 70° or more and preferably 80° or more to the plane normal. This provides “dark field” illumination. If additional “bright field” illumination is required then a radiation source may be located to provide radiation beams along or at a small angle (about 10° or less) to the normal defining the document surface under inspection.

At least one radiation detector is also preferably positioned to receive radiation forming a path defining a small angle (preferably 10° or less) with respect to the plane normal. Multiple radiation detectors may be provided, for example to receive radiation detected specularly and diffusely. One or more radiation detectors may also be positioned to receive radiation transmitted through the document. These may be used in place of, or in addition to, the reflective radiation detectors. Whilst various radiation sources may be used to generate ultra violet, visible or infra-red light, the radiation detectors are used to obtain images of the document surface when located at the inspection position and therefore such radiation detectors each preferably comprise a camera, CCD array, a line scan device or other imaging device.

In the case of sheet processing apparatus, the inspection position typically comprises part of a document transport path whereby multiple documents are serially brought to the inspection position for raised material detection. The subsequent processing of the documents is typically dependent upon the outcome of the detection process.

It is particularly preferred that the apparatus is used in banknote processing apparatus comprising at least one input receptacle, at least one output receptacle and transport system arranged to transport banknotes from the at least one input receptacle along a transport path to the at least one output receptacle. The apparatus according to the second aspect of the invention may be positioned along the transport path for detecting the presence of raised materials on the surface of the banknotes.

BRIEF DESCRIPTION OF THE DRAWINGS

Some examples of the method and apparatus according to the present invention are now described, with reference to the accompanying drawings, in which:—

DESCRIPTION OF EXAMPLES

We now discuss methods and apparatus for optical detection of raised materials (e.g. tapes, foils and even intaglio print) on documents (e.g. bank notes and vouchers). The key ingredients of the proposed method are “dark field illumination” and subsequent image analysis.

Dark field illumination involves side illumination at a fairly large angle with respect to the document surface normal (typically 70° or more). This makes the three-dimensional structure of the raised material document visible by effects including:

1. Side illumination: With single sided illumination, edges of the raised material facing towards the illumination appear bright, edges facing away from the illumination appear shadowed (dark);
2. Distributed side illumination: With distributed illumination, all edges of the raised material will appear bright in the image;
3. Measurement of surface roughness: Different surface characteristics (roughness) of the raised material and the uncovered document can yield different angle distributions of the light reflected and thereby an intensity change or a change of the spatial intensity statistics (texture) in the observed image.

The method may make use of one or more of these three effects in combination.

The model-based analysis involves consideration of the image intensity and edges, respectively, as well as its edge-filtered versions thereof, to distinguish the target material of interest, for example tape, from other structures such as wrinkles.

The method is expected to produce the best results with reflective imaging in most cases, although transmissive may be beneficial in some applications. In this case the illumination is not on the same side of the document as the camera or sensor.

Some examples are now described in more detail.

Example 1

Edge Marking by Single Sided Source

Bright and Dark Edge Pairs

Figure 1:
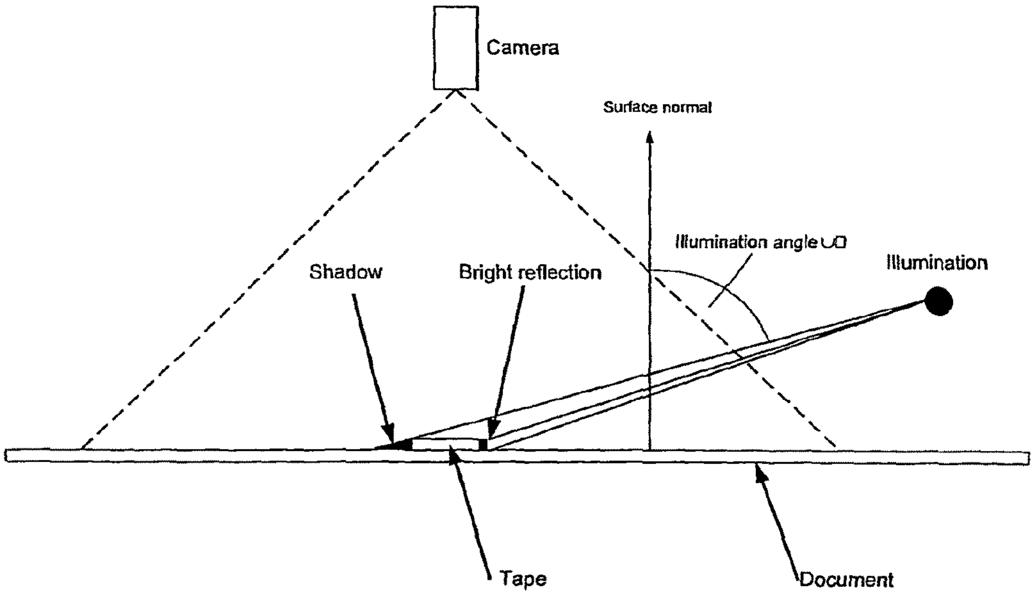
FIG. 1 shows a first example for tape detection.

FIG. 1 shows a first example in terms of the physical operation principle as far as the optics is concerned. The document (in this case a bank note) is observed from the top by a CCD camera in an attempt to detect adhesive tape attached to the document surface. Alternatively, the camera may be replaced by a line scan device (camera or contact image sensor), and the bank note is being transported perpendicular to the reading line, enabling the line reader to observe different subsequent stripes of the document line-by-line.

As opposed to conventional imaging aiming to minimise shadowing effects by ideally illuminating the document at close to a 0° angle to the surface normal, the illumination for tape detection proposed in the present invention, is placed such that the angle between illumination and document normal is sufficiently close to 90° to maximise the shadowing effect incurred by the three-dimensional structure of the substrate document.

In such a configuration, tape appears as a rectangular structure, with the edges facing towards the illumination appearing bright and the edges facing away from the illumination appearing dark (shadowed) in the image. Even for otherwise nearly invisible (non-shiny) tape this type of illumination is clearly revealing the tape structure.

Example 2

Distributed Illumination from Two or More Sides

Bright Edges

Figure 2:
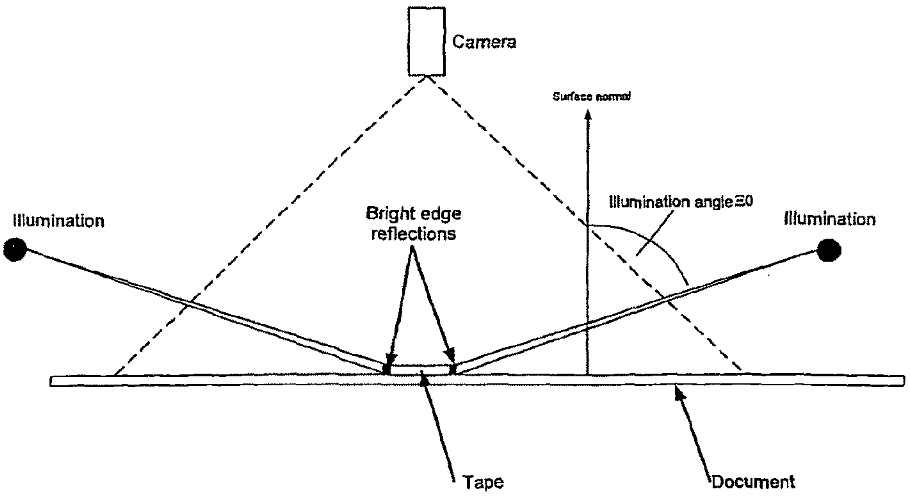
FIG. 2 shows a second example for tape detection illuminated from two sides.

An alternative arrangement to FIG. 1 is shown in the example of FIG. 2 with a directed illumination on both sides of the analysis area at the same angle. As an effect, edges at either side of the object will appear bright. This does have advantages since bright edges are usually easier to detect. However, the distinction between edges facing towards and away from the illumination gets lost.

Adding more directed light sources at the same angle around the analysis area the illumination would eventually become a ring.

Example 3

Shiny Reflections Making Tape Appear Darker

Regardless of the choice of the illumination as described above (single sided or distributed), a further very important effect is observed in such dark-field illumination.

Figure 3A:
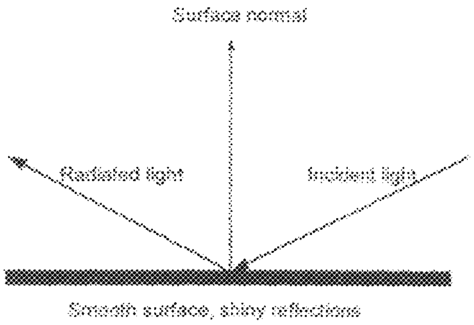
FIG. 3*a* shows how smooth shiny surfaces reflect radiation.
Figure 3B:
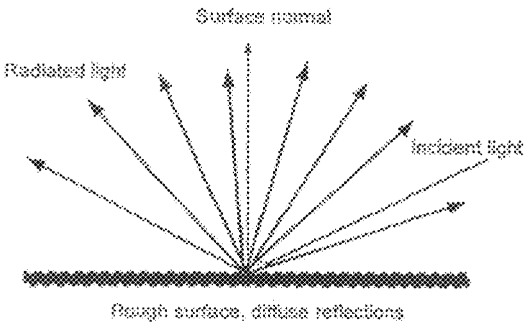
FIG. 3*b* shows how rough surfaces cause diffuse reflection.

Depending on its surface structure, any material possesses a particular light reflection distribution versus the emission angle (see FIGS. 3*a* and 3*b*). Generally, a smooth surface concentrates refection at the same angle of the incident light to the plane normal ("shiny" reflection), whereas a rough or complex structured surface may reflect light in almost all directions (diffuse reflection).

Consequently, when observing an object at an angle sufficiently different from the incident light, the object appears brighter if its surface is rough, and darker if it possesses a smooth surface. In case of a perfect shiny reflection the object may even appear completely black. This effect can be exploited as a measurement of surface roughness using the ratio of the intensity measured with dark-field illumination and the intensity measured with illumination parallel to the surface normal (bright field).

Since paper documents usually possess a very fine-structured (rough) surface, objects attached to it (in particular tape) will in most cases alter the surface smoothness of the respective area leading to a rectangular patch appearing darker than the uncovered surface.

Using the ratio of intensities the effect of the surface colour can be eliminated. The resulting ratio image may be called a "surface roughness image".

If the document identity is known (e.g. a particular bank note), the bright field illumination image does not actually need to be measured at run time, but may rather be stored in a model for combination with the measured dark-field image.

By way of further explanation, various arrangements of radiation sources are now described.

Arrangement 1: Edge Image with Single Side Source (Bright and Dark Edge Pairs)

Figure 4:
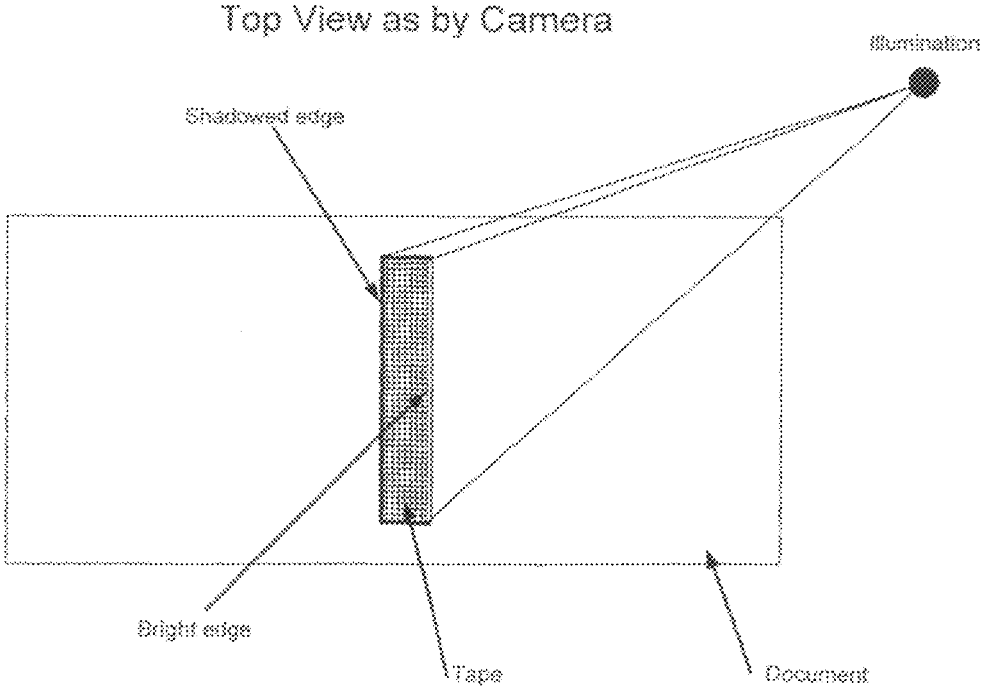
FIG. 4 is a view from above of a point source illumination.

FIG. 4 shows one option for the illumination arrangement using a single point source as for the first example. FIG. 4 may be thought of as the view from a camera positioned looking substantially along the plane normal of the document. Tape located as shown upon a document surface can be identified using this arrangement.

Arrangement 2: Edge Image with Elongated Source (Bright and Dark Edge Pairs)

Figure 5:
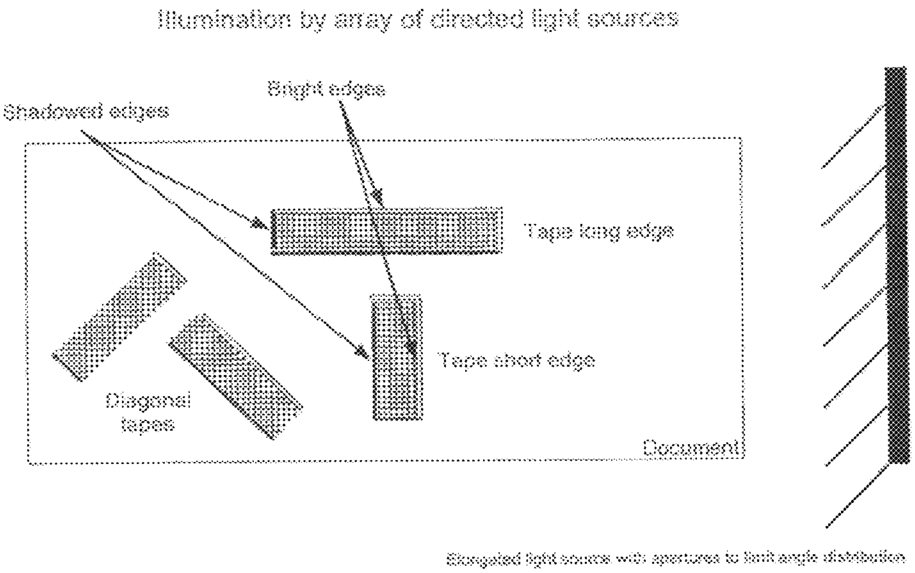
FIG. 5 shows an elongate collimated extended source.

Alternatively, an array of directed sources can be used as a source elongated in a direction perpendicular to the surface normal. This can also be used to implement the first example. The arrangement is shown in FIG. 5. In order to limit the extent to which each of the sources produce a distribution of radiation beams angles transversely within the document plane, a number of apertures are provided.

Arranging the illumination at a 45° angle with respect to the orientation of the rectangular document is optimal for the detection of "horizontal" and "vertical" tapes. However, diagonal tapes will have edges parallel to the illumination direction will neither show a shadow nor a bright reflection for such edges (as shown in FIG. 5).

In the cases of each of the examples described here, the radiation sources are collimated in the direction parallel to the plan normal—that is the waves of radiation can be thought of having common components in a direction parallel to the plane normal of the document.

Arrangement 3: Distributed Illumination (Bright Edges Only)

Figure 6:
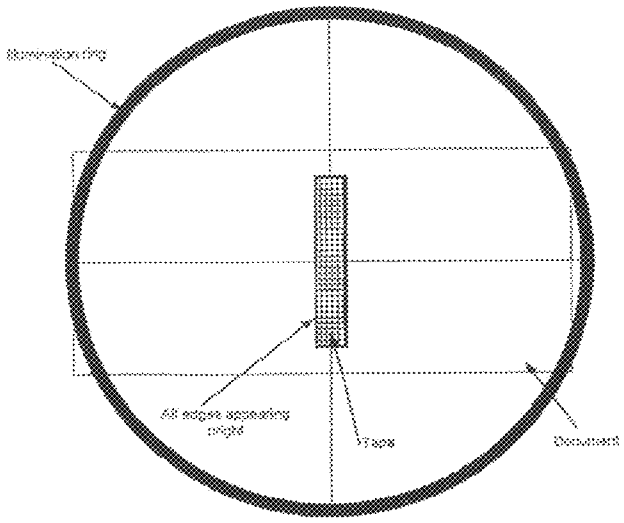
FIG. 6 shows a ring source arrangement.

If the intention is to mark all edges of the raised material as bright, a possible arrangement is that shown in the ring arrangement of FIG. 6 ensuring that all edges are equally illuminated. The illumination may be diffuse perpendicular to the surface normal but must again be directed or collimated (as for a point source) in the direction of the surface normal (as for FIG. 2).

Arrangement 4: Distributed Illumination Arrangement Yielding Bright Edges

Figure 7:
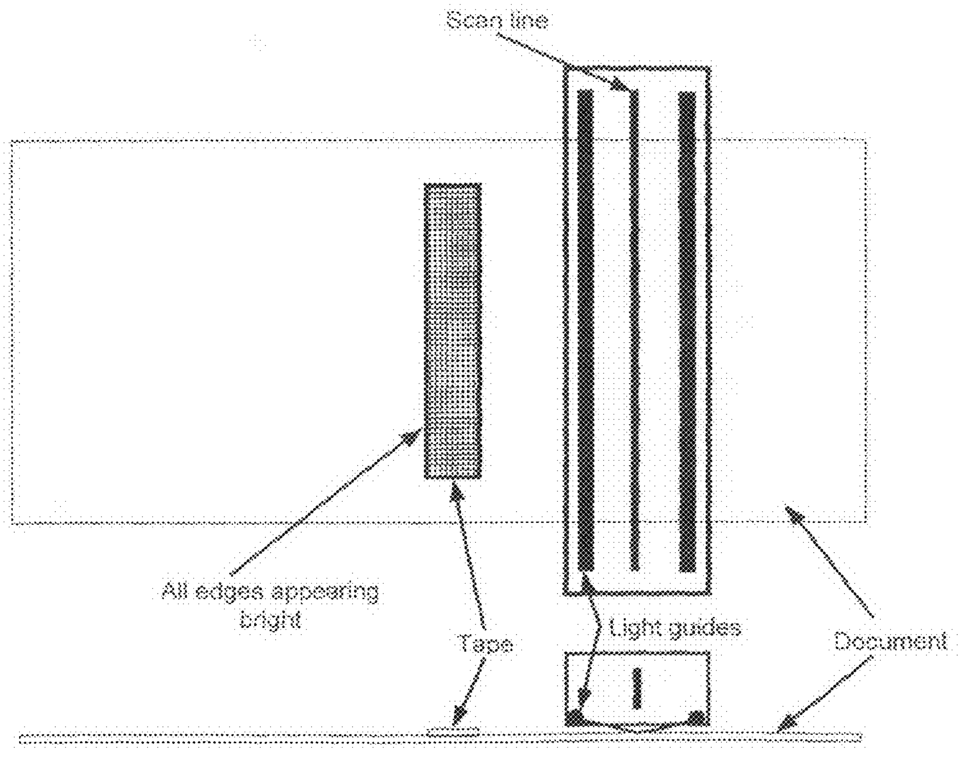
FIG. 7 shows an example using light guides.

For line cameras and line-reading contact image sensors it may be preferable to use two thin illumination bars (light guides or LED arrays) either side of the scan line. This is illustrated in FIG. 7. Again the point source "collimation"

characteristic in the direction of the surface normal will be important to maintain the dark-field illumination characteristic.

We turn now to how the image may be detected.

Detection and Processing

Figure 8:
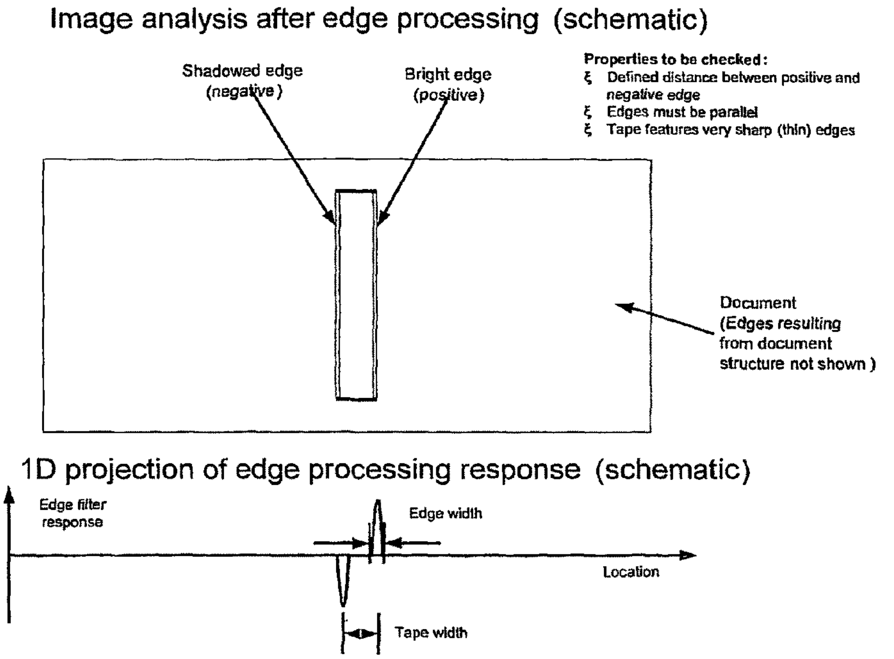
FIG. 8 shows the processing for edge detection.

FIG. 8 schematically depicts the edge image resulting from the original camera reading of FIG. 4 after filtering and what here is called edge colouring (see below). This is suitable for arrangements relating to Example 1.

In addition, the lower part shows a one-dimensional projection equivalent to a single row in the processed image.

The method for tape detection according to this example mainly comprises the following steps:

1. Filtering of the image with an edge filter.
2. Hough transform or any other method to detect candidates for straight lines in the image.
3. Edge colouring: Sorting of edges into positive (strong local increase of brightness) and negative (strong local decrease of brightness) candidates. This may be achieved by considering the 2nd derivative of the image.
4. Selection of a list of candidate edges in the image. This decision will take into account the edge structure of the document without tape (if known in advance).
5. Analysis of the edge structure in the image according to a model of tape.

The tape model used for detection refers to at one or more of the following characteristics:

1) Tape in almost all cases shows a close to rectangular structure with at least the left and right sides being nearly perfectly parallel (as opposed to beginning and end of the tape).

2) Pairs of parallel edges of the tape structure must be comprised of a positive (bright) and a corresponding negative edge (shadowed).

3) The edges of a tape must be in a range between a minimal and a maximal width.

4) Tape is an approximately rectangular object of a certain minimum length.

5) Each edge of the tape is typically very sharp (corresponding to a peak in the filtered image of a certain maximum width).

Figure 9:
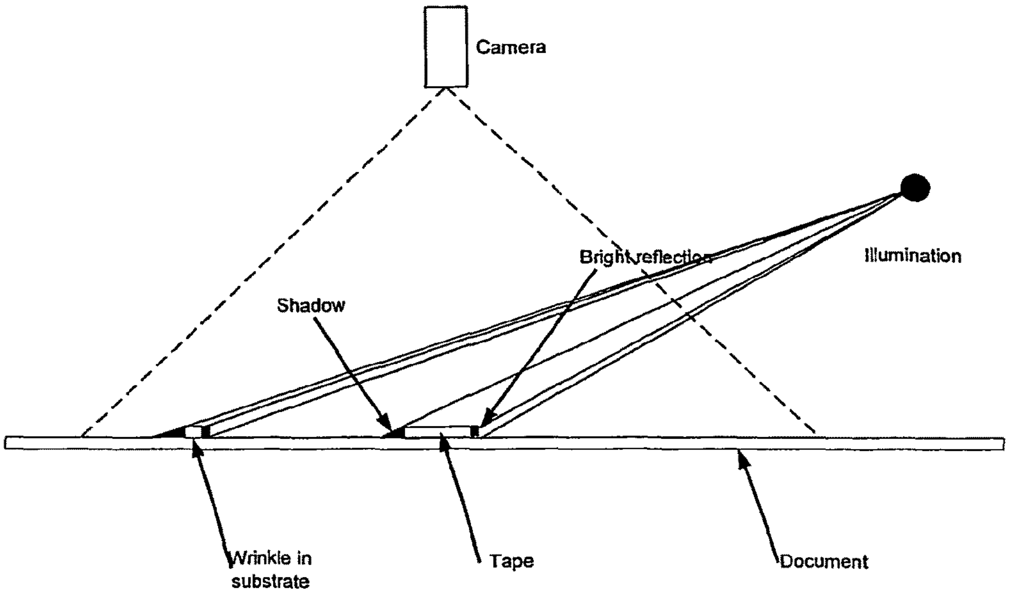
FIG. 9 shows the distinction between wrinkles and tape detection.

Both tape on the document and wrinkles of the document substrate do produce edges in the image (FIG. 9), along with shadow effects of similar strength.

However, the following characteristics enable wrinkles to be ruled out as candidates in the processed image:

i) Wrinkles are of much smaller width, therefore the positive and negative edges will be very close;

ii) Wrinkles are typically equivalent lines of varying width in the filtered edge image; and, iii) Wrinkles are typically of less regular structure than tape edges, i.e. not perfectly straight.

Figure 10:
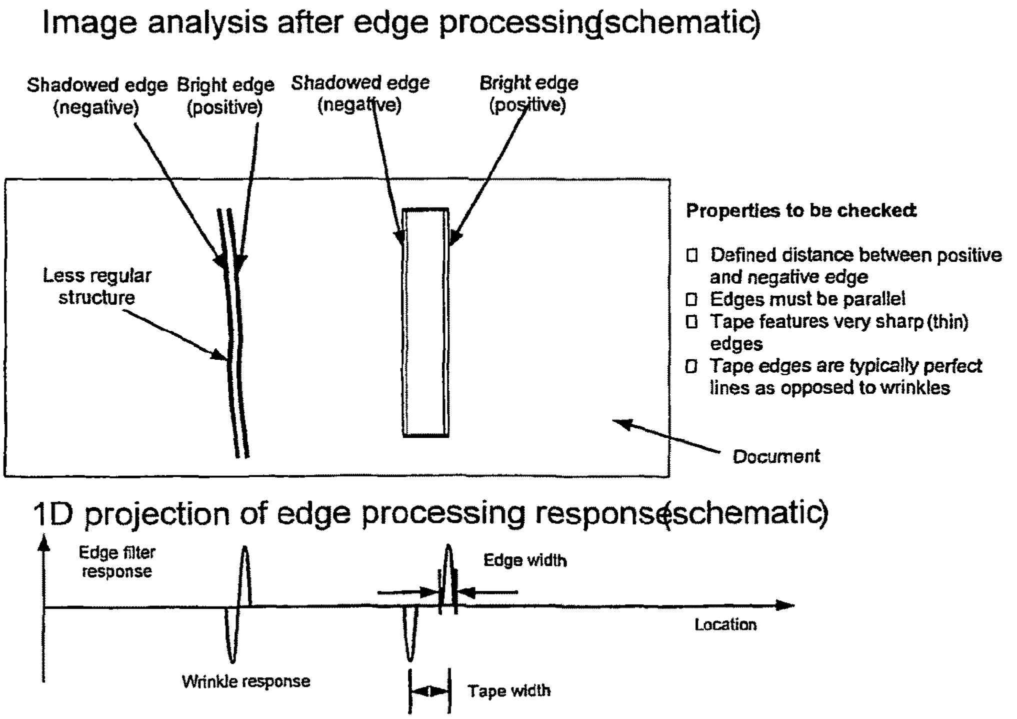
FIG. 10 shows edge processing for wrinkles and tape.

FIG. 10 schematically depicts the concept in an analogous sense to FIG. 8.

Detection in the case of Example 2 works in a similar manner to the above for Example 1 except that it is not possible to take advantage of edge colouring to arrange edges in pair during the analysis stage. All other modelling characteristics still apply.

Detection using a Surface Roughness Image can be used in accordance with Example 3. The darkening effect of a smooth (shiny) surface under dark-field illumination, will draw a dark patch in the surface roughness image in case of a raised object with such a surface characteristic, e.g. a tape will to show up as an approximately rectangular dark stripe.

Figure 11:
FIG. 11 is an image with side illumination illustrating the visibility of the raised material.

Since the tape is likely to be transparent, the underlying printed pattern of the document will still be visible. For this reason, use of infra-red illumination may be preferable. FIG. 11 shows how "shiny" tape may be made visible using dark-field illumination using a surface roughness image.

Much like for the edge-based techniques, the corresponding detection algorithm will first identify candidate regions for the raised objects and then compare these with a model (e.g. comprising the requirements of parallel edges, width and length ranges etc).

Similarly, measures should be taken to avoid false decision results e.g. from wrinkles, printing defects, stains etc.

Figure 12:
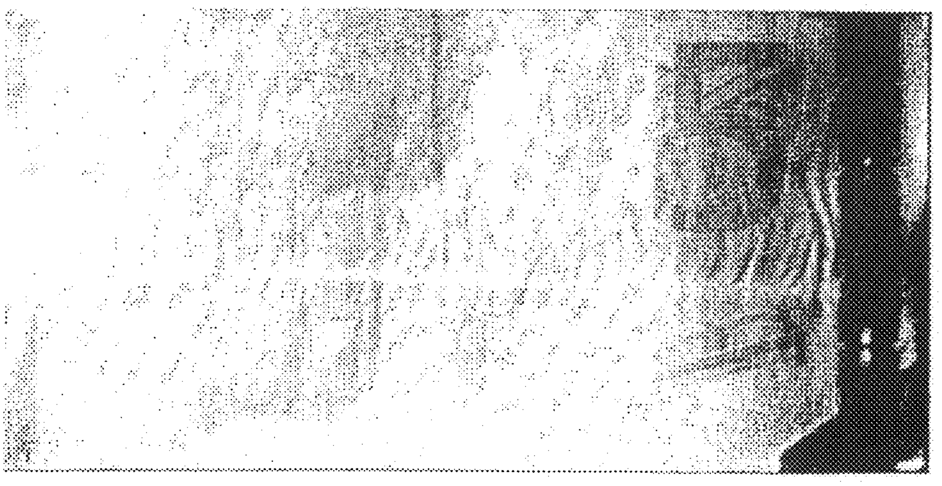
FIG. 12 is an image showing heavy wrinkles in addition to matt finished tape.
Figure 13:
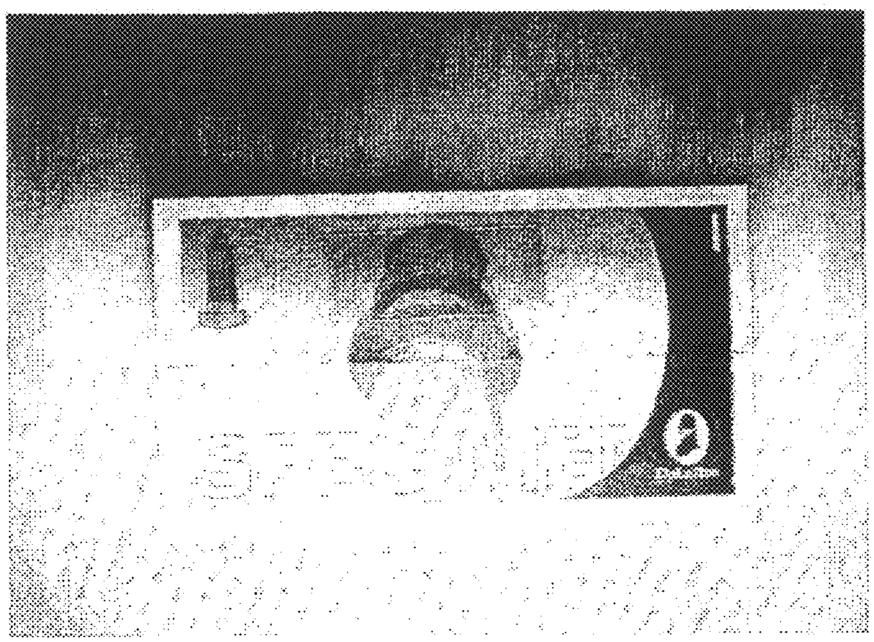
FIG. 13 shows a further image, with minor wrinkles and matt tape.

The effectiveness of the above technique of FIG. 11 depends upon the surface roughness of the tape. In the case of magic tape which has a rough surface, the location of the tape is more difficult to detect since this tape does not yield a significant intensity reduction in the dark-field image and may get lost in the presence of other surface effects and in the print. However, the magic tape may typically be detected by a change of the local intensity statistics (texture) of the observed image. In the case that the statistics do not change then the magic tape will be detectable using the edge-based techniques described above. FIG. 12 shows an example of a "worst case" scenario in dark field illumination with heavy wrinkles. It will be appreciated that the matt finish of the tape in this case means that edge detection may be needed. A further example using a tape with matt finish and less wrinkling is shown in FIG. 13.

Figure 14:
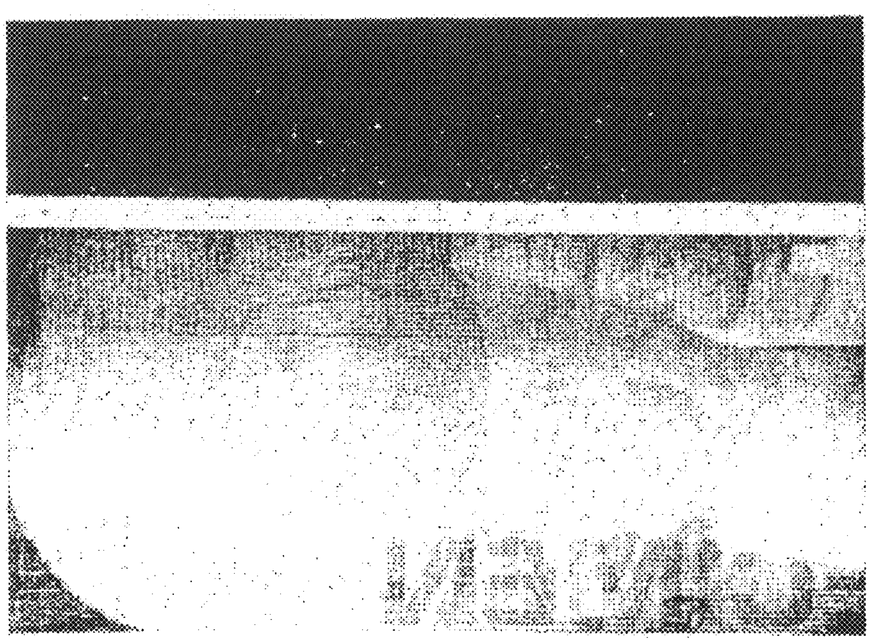
FIG. 14 is a transmissive image.

FIG. 14 demonstrates that a "transmissive" arrangement can be used, the figure showing the edge effects in particular (top centre of the image).

The invention claimed is:

1. A method of detecting a region of raised material on a document surface comprising:

illuminating a surface of the document with at least one angled radiation beam such that any raised material on the document surface reflects the radiation;

imaging the surface containing the raised material using at least one radiation detector; and, processing the image to detect the existence on the document surface of the raised material;

wherein the illuminating causes a reflection and/or shadow to be generated from at least one edge of the raised material and wherein the processing step detects the location of the material using the said reflection and/or shadow from the at least one edge.

2. A method according to claim 1, wherein the document surface is substantially planar, at least during the illuminating and imaging steps.

3. A method according to claim 1, wherein the raised material comprises material added to the document subsequent to the manufacture of the document.

4. A method according to claim 1, wherein the raised material comprises material adhered to the document surface by a party other than the document manufacturer.

5. A method according to claim 1, wherein the surface is defined by a plane normal and wherein each radiation beam is directed at a large angle with respect to the plane normal.

6. A method according to claim 5, wherein the angle of each beam is 80 degrees or more to the plane normal.

7. A method according to claim 1, wherein each radiation beam is substantially collimated in a direction substantially parallel with the normal to the document surface.

8. A method according to claim 7, further comprising a plurality of radiation beams.

9. A method according to claim 8, wherein the radiation beams are provided from radiation sources positioned substantially along lines to one or more sides of the document surface.

10. A method according to claim 8, wherein the radiation beams are provided from radiation sources positioned distributed around the document surface.

11. A method according to claim 9, wherein the radiation sources are positioned in substantially a plane parallel with the document surface.

12. A method according to claim 1, wherein the document surface is defined by a plane normal and wherein each radiation detector is positioned to receive radiation following a path defining a small angle with respect to the plane normal.

13. A method according to claim 12, wherein the small angle is 10 degrees or less.

14. A method according to claim 1, wherein at least one radiation detector is on the opposite side of the document to the material such that the detected radiation is transmitted through the document prior to receipt.

15. A method according to claim 1, wherein a radiation detector is provided and located to detect light specularly reflected from the document surface, and wherein the step of processing the image comprises searching for a box with parallel lines within the image.

16. A method according to claim 1, wherein two radiation detectors are provided, one of which is located to detect light specularly reflected from the document surface and the other is located to detect light diffusely reflected from the document surface.

17. A method according to claim 15, further comprising obtaining an image using specular reflection and an image using diffuse reflection.

18. A method according to claim 1, further comprising simultaneously and/or subsequently illuminating the document with a radiation beam along or making a small angle with a normal to the document plane so as to obtain a bright field image of the document.

19. A method according to claim 18, wherein the bright field image is used in the processing step.

20. A method according to claim 1, wherein the step of processing the image further comprises:

filtering the image with an edge filter;

identifying straight line candidates within the filtered image;

comparing the identified candidates with a model of the raised material to be detected; and, determining the location of the material based upon the comparison.

21. A method according to claim 20, wherein the model comprises data representative of a clean or genuine document.

22. A method according to claim 20, wherein the step of processing the image further comprises:

identifying candidate regions by comparing the specular and diffuse reflection images;

filtering the specular and/or diffuse reflection images or a ratio or difference thereof with an edge filter;

identifying straight line candidates within the filtered image;

comparing the identified candidates with a model of the raised material to be detected; and, determining the location of the material based upon the comparison.

23. A method according to claim 22, wherein step (c) further comprises excluding candidates present within a predefined template.

24. A method according to claim 20, further comprising, after the identifying step, separating the identified candidates into positive candidates representative of increased intensity with respect to the background, and negative candidates representative of decreased intensity with respect to the background.

25. A method according to claim 24, further comprising a step of identifying one or more edges of the document and removing these from the candidates.

26. A method according to claim 20, further comprising analysing the straight line candidates to obtain dimensional information and using the dimensional information in the comparison step.

27. A method according to claim 26, wherein the model includes the arrangement of the straight line candidates in pairs of spaced parallel lines.

28. A method according to claim 26, wherein the model includes the arrangement of lines spaced within a predetermined separation range.

29. A method according to claim 26, wherein the model includes the arrangement of lines lying within a predetermined length range.

30. A method according to claim 26, wherein the model includes the arrangement of lines so as to form a rectangle.

31. A method according to claim 20, wherein the model includes a predetermined sharpness of the lines.

32. A method according claim 1, wherein the model is further adapted to distinguish between document surface defects and the raised material.

33. A method according to claim 1, wherein the method is adapted to detect raised material in the form of one or more of tape, a security device, raised print attached to the document.

34. A method according to claim 1, wherein the raised material projects above the planar document surface and provides a general plateaued region of elevated material, raised with respect to the document surface and defined by one or more circumferential edges.

35. A method according to claim 1, wherein the document is a security document.

36. A method according to claim 1, wherein the radiation is ultraviolet, visible or infrared light.

37. Apparatus for detecting a region of raised material on a document surface comprising:

at least one radiation source for illuminating, with a respective angled radiation beam, a surface of a document placed in an inspection position such that any raised material on the document surface reflects the radiation causing a reflection and/or shadow to be generated from at least one edge of the raised material;

at least one radiation detector for obtaining an image of the illuminated document surface; and, a processor adapted to process an image received from the radiation detector so as to identify the existence on the document surface of the raised material by identifying the location of the material using the said reflection and/or shadow from the said at least one edge.

38. Apparatus according to claim 37, wherein each radiation source is arranged to generate a beam substantially collimated in a direction substantially parallel with the normal to the document surface.

39. Apparatus according claim 37, wherein a radiation source is positioned upon opposing sides of the document.

40. Apparatus according to claim 37, wherein a plurality of radiation sources are positioned substantially along lines to one or more sides of the document surface.

41. Apparatus according to claim 38, wherein, a number of the radiation sources together comprise a common elongate source, having a plurality of apertures distributed along its length.

42. Apparatus according to claim 38, wherein a plurality of radiation sources are provided, encircling the document.

43. Apparatus according to claim 42, wherein the sources comprise a common encircling source, having a plurality of apertures distributed along its length.

44. Apparatus according to claim 37, wherein the radiation sources are positioned in substantially a plane parallel with the document surface.

45. Apparatus according to claim 37, wherein the document surface is defined by a plane normal and wherein the at least one radiation source is arranged to generate a radiation beam that defines a large angle with respect to the plane normal.

46. Apparatus according to claim 45, wherein the radiation source is arranged such that the angle of the beam is 80 degrees or more to the plane normal.

47. Apparatus according to claim 37, wherein the document surface is defined by a plane normal and wherein the at least one radiation detector is positioned to receive radiation following a path defining a small angle with respect to the plane normal.

48. Apparatus according to claim 47, wherein the small angle is 10 degrees or less.

49. Apparatus according to claim 37, wherein a radiation detector is positioned to receive specularly reflected radiation, and wherein a second radiation detector is positioned to receive diffusely reflected radiation.

50. Apparatus according to claim 37, wherein at least one detector is positioned on the opposite side of the document to the material such that the detected radiation is transmitted through the document prior to receipt.

51. Apparatus according to claim 37, further comprising a radiation source for positioned so as to produce a bright field image by illuminating the document with a radiation beam along or making a small angle with a normal to the document plane.

52. Apparatus according to claim 37, wherein each radiation source is an ultraviolet, visible or infrared light source.

53. Apparatus according to claim 37, wherein the radiation detector is selected from the group of, a camera, CCD array or a line scan device.

54. Apparatus according to claim 37, wherein the inspection position comprises part of a document transport path.

55. Bank note processing apparatus comprising a least one input receptacle; at least one output receptacle; a transport system arranged to transport bank notes from the input receptacle(s) along a transport path to the output receptacle(s); and apparatus according to claim 37, positioned along the transport path for detecting the presence of raised material on a surface of the bank notes.

* * * * *